(12) United States Patent
Suetsugu et al.

(10) Patent No.: US 8,365,587 B2
(45) Date of Patent: Feb. 5, 2013

(54) METHOD AND DEVICE FOR DETECTING ABNORMALITY OF ENGINE

(75) Inventors: Hajime Suetsugu, Higashihiroshima (JP); Kenji Kojima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 307 days.

(21) Appl. No.: 12/944,502

(22) Filed: Nov. 11, 2010

(65) Prior Publication Data

US 2011/0113870 A1 May 19, 2011

(30) Foreign Application Priority Data

Nov. 13, 2009 (JP) ................................. 2009-260361

(51) Int. Cl.
*G01M 15/10* (2006.01)
(52) U.S. Cl. ..................................... 73/114.72; 73/23.32
(58) Field of Classification Search .................. 73/23.32, 73/114.71, 114.72, 114.73
See application file for complete search history.

(56) References Cited

U.S. PATENT DOCUMENTS

| | | | | |
|---|---|---|---|---|
| 7,063,080 B2 * | 6/2006 | Kita et al. | ...................... | 123/673 |
| 7,519,467 B2 * | 4/2009 | Katoh | ........................... | 701/103 |
| 7,677,091 B2 * | 3/2010 | Mukai et al. | ................ | 73/114.37 |
| 8,024,105 B2 * | 9/2011 | Iwazaki et al. | ................ | 701/107 |
| 2005/0161033 A1 * | 7/2005 | Okamoto et al. | ............. | 123/673 |
| 2006/0005821 A1 * | 1/2006 | Osumi et al. | ................. | 123/674 |

FOREIGN PATENT DOCUMENTS

JP 2008-121533 A 5/2008

* cited by examiner

*Primary Examiner* — Eric S McCall
(74) *Attorney, Agent, or Firm* — Alleman Hall McCoy Russell & Tuttle LLP

(57) ABSTRACT

This disclosure provides a method of detecting a cylinder-to-cylinder gap abnormality of an air fuel ratio with sufficient accuracy according to an individual specificity of an air fuel ratio detecting module. Particularly, the method may be used for an engine to detect the cylinder-to-cylinder gap abnormality of the air fuel ratio of supplied air fuel mixture abnormality based on an output value of a linear $O_2$ sensor. Under a first predetermined condition, an output characteristic of the sensor is measured. The measured output characteristic is compared with a reference characteristic set in advance to calculate a correction value for correcting the sensor output according to the individual specificity of the sensor. Subsequently, under a second predetermined condition, the sensor output value is corrected based on the calculated correction value to detect the abnormality based on the corrected output value of the sensor.

8 Claims, 12 Drawing Sheets

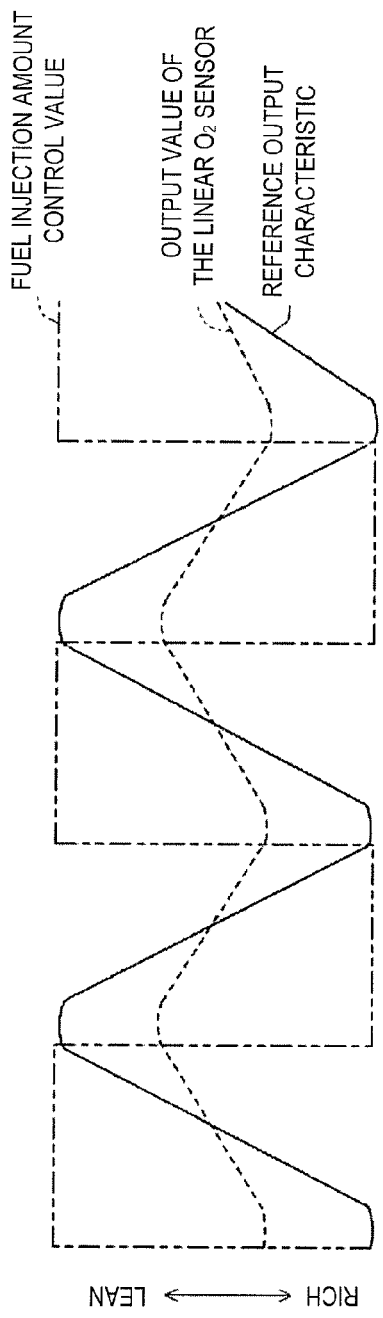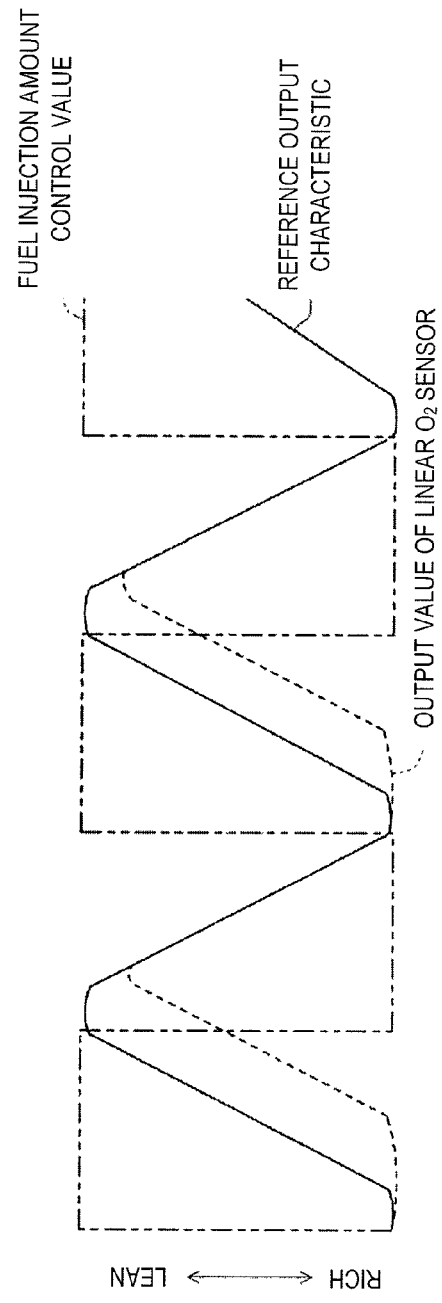

METHOD AND DEVICE FOR DETECTING ABNORMALITY OF ENGINE

BACKGROUND

The present invention relates to a method and device for detecting an abnormality of an engine, where the abnormality is a cylinder-to-cylinder gap of air fuel ratio of air fuel mixture which is supplied to engine cylinders, based on an output value of an air fuel ratio detecting module.

Conventionally, in order to raise a purification rate of a harmful component in exhaust gas by a catalyst provided in the exhaust passage, an air fuel ratio feedback control for correcting a feedback correction amount is known in the art. This control makes the correction so that the air fuel ratio of the exhaust gas becomes the theoretical air fuel ratio based on the output of an air fuel ratio sensor for detecting the air fuel ratio of the exhaust gas.

In many cases, the air fuel ratio control system for performing this kind of air fuel ratio feedback control is provided with an abnormality determination function. This function determines that the air fuel ratio of any of the cylinders is abnormal when it is hard to bring the air fuel ratio of the exhaust gas close to a theoretical air fuel ratio depending on the correction with the feedback correction amount (for example, when the cylinder-to-cylinder gap of the air fuel ratio of the air fuel mixture is caused).

For example, JP2008-121533A discloses a control device of an internal combustion engine. In this control device, an air fuel ratio sensor is provided in an engine exhaust passage, and an air fuel ratio of an air fuel mixture supplied to each cylinder is suppressed based on an output signal of the air fuel ratio sensor. A sensor signal rate-of-change integration means calculates a rate of change in the air fuel ratio sensor signal at a given time interval, and integrates absolute values of the rates of change. The control device determines whether the air fuel ratio of any cylinder is abnormal based on the rate-of-change integrated value of the air fuel ratio sensor signals.

In the meantime, the output value of the air fuel ratio sensor needs to be appropriately secured as the premise for performing a high-precision abnormality determination. However, it is known in the art that a variation will be caused in the output value of the air fuel ratio sensor as the sensor is degraded (time-varying individual specificity), and, the variation will also be caused in the output value due to the mechanical individual specificity of the sensor product.

In this regard, JP2008-121533A requires the abnormality of the air fuel ratio sensor not being detected by a self-diagnostic function when performing the abnormality diagnosis of the air fuel ratio of any of the cylinders. However, as described above, because any positive measures are not taken against the mechanical individual specificity or the time-varying individual specificity of the air fuel ratio sensor, there is a problem that the abnormality diagnosis may not be performed when there is a variation in the output value, which is caused by the individual specificities of the air fuel ratio sensor.

Moreover, it is also known in the art that the output fall of the air fuel ratio sensor is corrected according to the time-varying individual specificity of the air fuel ratio sensor. However, if the mechanical individual specificity of the air fuel ratio sensor is not taken into the consideration, the detection result may be affected even if the cylinder-to-cylinder gap abnormality is detected in the air fuel ratio on the same conditions.

SUMMARY

The present invention is made in view of the above situations to provide a method and device of an engine for detecting a cylinder-to-cylinder gap abnormality of an air fuel ratio based on an output of an air fuel ratio detecting module. This technique detects the cylinder-to-cylinder gap abnormality in the air fuel ratio with sufficient accuracy, according to individual specificities of the air fuel ratio detecting module.

To achieve the above technique, in the claims, a reference characteristic is set in advance, which serves as an index of determination whether an appropriate output characteristic of the air fuel ratio detecting module is obtained, and corrects the output of the air fuel ratio detecting module according to the individual specificities of the air fuel ratio detecting module.

According to one aspect of the invention, a method of detecting an abnormality for an engine is provided, which includes providing an air fuel ratio detecting module in an engine exhaust system, the air fuel ratio detecting module outputting a value proportional to an oxygen concentration in exhaust gas, measuring an output characteristic of the air fuel ratio detecting module under a first predetermined condition, comparing the measured output characteristic with a reference characteristic set in advance and calculating a correction value for correcting the output value of the air fuel ratio detecting module according to an individual specificity of the air fuel ratio detecting module, for detecting the output value of the air fuel ratio detecting module under a second predetermined condition and correcting the detected output value based on the correction value, and detecting a cylinder-to-cylinder gap abnormality of an air fuel ratio of supplied air fuel mixture based on the corrected output value of the air fuel ratio detecting module.

The term "individual specificity" as used herein includes a mechanical individual specificity of a product (product variation) as well as a time-varying individual specificity (i.e., a degree of degradation).

If the first predetermined condition is satisfied while a vehicle is traveling (for example, an engine speed reaches a predetermined speed), the measurement of the output characteristic by the air fuel ratio detecting module is started. Thus, when the output characteristic is measured, the output characteristic is compared with the reference characteristic set in advance, and the correction value for correcting the output value of the air fuel ratio detecting module is calculated according to the mechanical individual specificity and/or the time-varying individual specificity (degree of degradation) of the air fuel ratio detecting module.

After the calculation of the correction value, if the second predetermined condition is satisfied, the output value of the air fuel ratio detecting module is detected, and based on the calculated correction value (for example, using the calculated correction value or a value obtained by multiplying the correction value by a correction coefficient), the output value of the air fuel ratio detecting module is corrected. Thus, based on the corrected output value of the air fuel ratio detecting module, the detection of the cylinder-to-cylinder gap abnormality of the air fuel ratio of the supplied air fuel mixture is performed.

As described above, even when an appropriate output value is not outputted due to the individual specificity of the air fuel ratio detecting module, the output value of the air fuel ratio detecting module detected under the second predetermined condition is corrected based on the correction value calculated under the first predetermined condition. Thereby, the cylinder-to-cylinder gap abnormality of the air fuel ratio can be detected with sufficient accuracy.

In one embodiment, the correction value may take a value so that the output value of the air fuel ratio detecting module is increased when the measured output characteristic is small as compared with the reference characteristic, and may take a value so that the output value of the air fuel ratio detecting module is decreased when the measured output characteristic is large as compared with the reference characteristic.

Thus, when the measured output characteristic is small as compared with the reference characteristic, the correction value takes the value so that the output value of the air fuel ratio detecting module is increased. Therefore, when the cylinder-to-cylinder gap of the air fuel ratio is large in fact, an erroneous determination that it is not abnormal can be suppressed. On the other hand, when measured output characteristic is large as compared with the reference characteristic, the correction value takes the value so that the output value of the air fuel ratio detecting module is decreased. Therefore, when the cylinder-to-cylinder gap of the air fuel ratio is very small in fact, an erroneous determination that it is abnormal can be suppressed.

In one embodiment, the output value correcting step may include correcting the correction value based on a value related to an exhaust gas flow rate and/or an engine speed when correcting the output value of the air fuel ratio detecting module. The output value of the air fuel ratio detecting module may be corrected based on the corrected correction value.

A load and an engine speed when calculating the correction value for correcting the output value of the air fuel ratio detecting module, and a load and an engine speed when detecting the output value of the air fuel ratio detecting module, which are to be corrected based on the correction value, may be excessively deviated from each other. In such a case, it may be difficult to detect the cylinder-to-cylinder gap abnormality of the air fuel ratio with sufficient accuracy.

The correction value calculated at the correction value calculating step is not applied as it is in the output value correcting step, but the correction value is corrected based on the value related to the exhaust gas flow rate (load) and/or the engine speed when correcting the output value of the air fuel ratio detecting module. Therefore, even if the correction value calculated on a different traveling condition is used, the cylinder-to-cylinder gap abnormality of the air fuel ratio can be detected with sufficient accuracy.

In one embodiment, the correction value may be corrected to be larger as the value related to the exhaust gas flow rate when correcting the output value of the air fuel ratio detecting module decreases rather than the value related to the exhaust gas flow rate when measuring the output characteristic of the air fuel ratio detecting module, and may be corrected to be smaller as the value related to the exhaust gas flow rate when correcting the output value of the air fuel ratio detecting module increases rather than the value related to the exhaust gas flow rate when measuring the output characteristic of the air fuel ratio detecting module.

A volume of a space from one cylinder to the air fuel ratio detecting module is constant. Thus, a time it takes the exhaust gas to reach the air fuel ratio detecting module after being discharged from the cylinder is based on the speed of the exhaust gas filling the space or, for example, based on the exhaust gas flow rate. In other words, a time it takes the exhaust gas to be detectable by the air fuel ratio detecting module after being discharged from the cylinder is shorter as the exhaust gas flow rate increases. Therefore, when the exhaust gas flow rate is high, the output characteristic of the air fuel ratio detecting module is measured as if it is improved as compared with a case where the exhaust gas flow rate is low.

The correction value is corrected to be larger as the value related to the exhaust gas flow rate when correcting the output value of the air fuel ratio detecting module decreases rather than the value related to the exhaust gas flow rate when measuring the output characteristic of the air fuel ratio detecting module. The correction value is corrected to be smaller as the value related to the exhaust gas flow rate when correcting the output value of the air fuel ratio detecting module increases rather than the value related to the exhaust gas flow rate when measuring the output characteristic of the air fuel ratio detecting module. Therefore, even if the correction value calculated under the condition in which the value related to the exhaust gas flow rate differs is used, the cylinder-to-cylinder gap abnormality of the air fuel ratio can be detected with sufficient accuracy.

In one embodiment, the correction value may be corrected to be smaller as the engine speed decreases when the engine speed at the time of correcting the output value of the air fuel ratio detecting module decreases to less than the engine speed at the time of measuring the output characteristic of the air fuel ratio detecting module, and may be corrected to be larger as the engine speed increases when correcting the output value of the air fuel ratio detecting module increases to more than the engine speed when measuring the output characteristic of the air fuel ratio detecting module.

When the engine speed increases, a time required for the air fuel ratio detecting module to detect the change in the air fuel ratio is not necessarily shortened, but an interval of the change becomes shorter. Therefore, while detecting the air fuel ratio of exhaust gas discharged from a certain cylinder, the air fuel ratio is influenced by air fuel ratios of exhaust gas discharged from other cylinders. For this reason, when the engine speed is high, the output characteristic of the air fuel ratio detecting module is measured so that it is decreased as compared with a case where the engine speed is low.

The correction value is corrected to be smaller as the engine speed when correcting the output value of the air fuel ratio detecting module decreases rather than the engine speed when measuring the output characteristic of the air fuel ratio detecting module. On the other hand, the correction value is corrected to be larger as the engine speed when correcting the output value of the air fuel ratio detecting module increases rather than the engine speed when measuring the output characteristic of the air fuel ratio detecting module. Therefore, even if the correction value calculated in a different engine speed is used, the cylinder-to-cylinder gap abnormality of the air fuel ratio can be detected with sufficient accuracy.

In one embodiment, the output characteristic may be related to a dead time and a response.

The term "dead time" as used herein refers to a time it takes to detect the change in the air fuel ratio of the exhaust gas by the air fuel ratio detecting module after the air fuel ratio of the air fuel mixture is changed. Moreover, the term "response" as used herein refers to a rate of change in the air fuel ratio detected after the air fuel ratio detecting module detects the change in the air fuel ratio of the exhaust gas.

It is possible to calculate a suitable correction value reflecting the dead time and the response of the air fuel ratio detecting module. Thereby, the output value of the air fuel ratio detecting module can be corrected appropriately.

In one embodiment, the reference characteristic may be set based on a median of a variation in the output characteristic of the air fuel ratio detecting module, which is caused by a mechanical individual specificity of the air fuel ratio detecting module.

Thus, the reference characteristic of the air fuel ratio detecting module is calculated after the air fuel ratio detecting module having an extremely long dead time and having a low response is excluded from the air fuel ratio detecting module. Thereby, reliability to the reference characteristic improves.

According to another aspect of the invention, an abnormality detecting device for an engine is provided, which includes an air fuel ratio detecting module provided in an engine exhaust system and for outputting a value proportional to an oxygen concentration in exhaust gas, a measuring module for measuring an output characteristic of the air fuel ratio detecting module under a first predetermined condition, a correction value calculating module for comparing the measured output characteristic with a reference characteristic set in advance and calculating a correction value for correcting the output value of the air fuel ratio detecting module according to an individual specificity of the air fuel ratio detecting module, and an output value correcting module for correcting the output value of the air fuel ratio detecting module under a second predetermined condition based on the correction value calculated by the correction value calculating module. A cylinder-to-cylinder gap abnormality of an air fuel ratio of supplied air fuel mixture is detected based on an output value of the air fuel ratio detecting module as corrected by the output value correction module.

Therefore, similar effects to the method of detecting an abnormality for the engine can be attained.

BRIEF DESCRIPTION OF THE DRAWINGS

FIGS. 5A and 5B are graphs schematically showing a relation between a measured output characteristic of the linear $O_2$ sensor and a reference characteristic, where FIG. 5A shows a case where a measured response is smaller than a reference response, and FIG. 5B shows a case where a measured dead time is longer than a reference dead time.

DESCRIPTION OF THE EMBODIMENTS

Hereinafter, embodiments of the present invention are described in detail based on the appended drawings.

Figure 1:
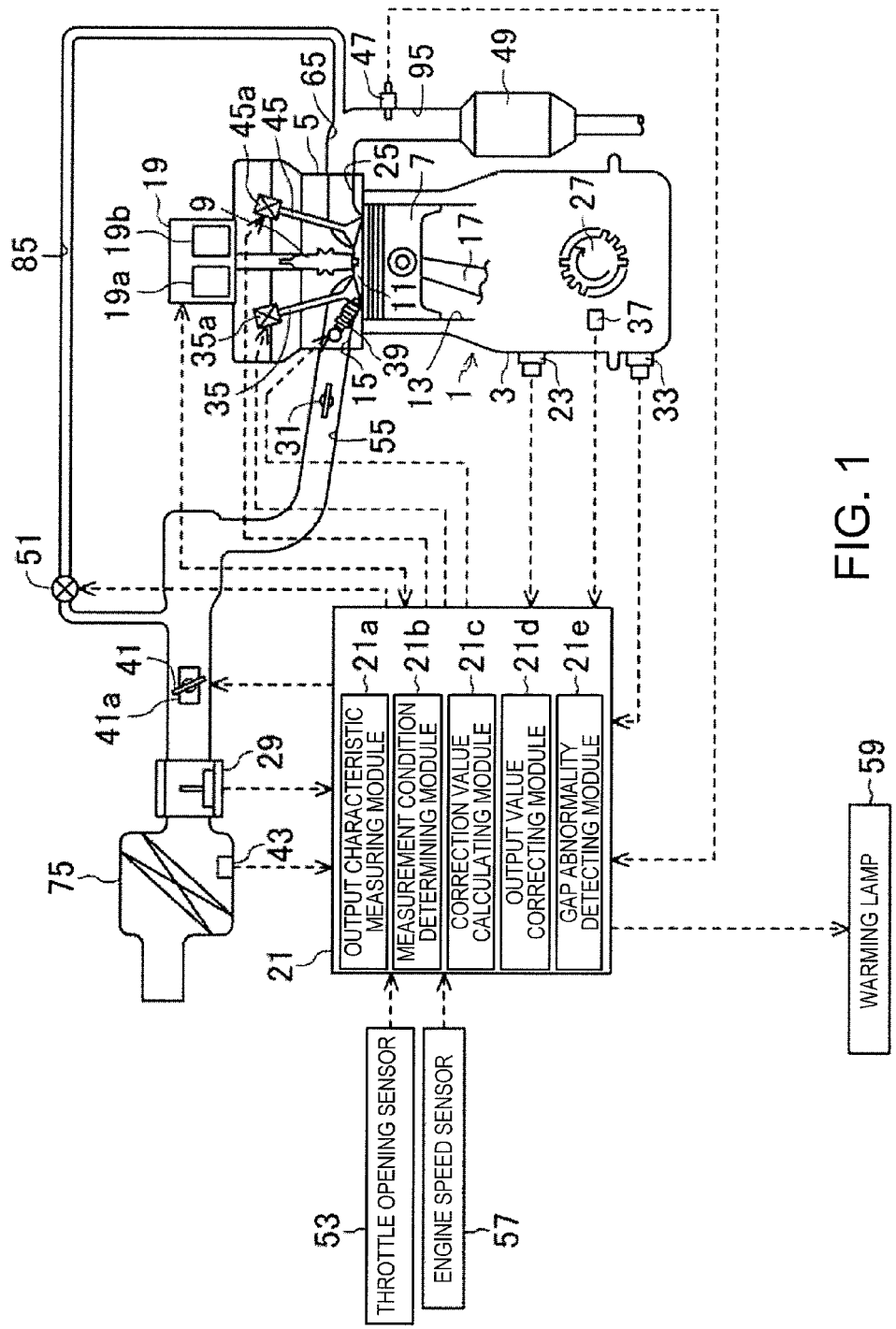
FIG. 1 is a schematic diagram of a control system of an engine according to one embodiment of the present invention.

FIG. 1 is a schematic diagram of an engine control system according to the embodiment of the present invention. The engine 1 is an in-line, four-cylinder, jump-spark-ignition type direct injection gasoline engine, and each cylinder includes a cylinder block 3 and a cylinder head 5 fixed to an upper part of the cylinder block 3. Reciprocatable pistons 7 are fitted into cylinders 13 of the cylinder block 3, respectively. Each combustion chamber 11, which is surrounded by a top face of the piston 7, an inner wall surface of the cylinder 13, and a pentroof-shaped bottom face of the cylinder head 5, is formed above the corresponding piston 7. A crankshaft (not shown) is arranged in a crankcase below the pistons 7, and it is connected with the pistons 7 with respective connecting rods 17.

Inside the crankcase, a crank angle sensor 37 for detecting a rotation angle of the crankshaft (crank angle) is provided. The crank angle sensor 37 has an electromagnetic pickup coil for outputting a signal to a PCM (Power-train Control Module) 21 at a timing corresponding a rotation of a rotor 27 attached to an end of the crankshaft so as to integrally rotate with the crankshaft. Specifically, the signal is outputted as the rotation passes a convex part formed on the peripheral of the rotor 27.

In addition, an engine coolant temperature sensor 23 for detecting a temperature of coolant which flows inside of water jackets (not shown), and an engine oil temperature sensor 33 for detecting a temperature of engine oil, are provided to the cylinder block 3.

Two or more spark plugs 9 are provided to the cylinder head 5, corresponding to the respective cylinders 13. A tip electrode of each spark plug 9 is located inside the corresponding combustion chamber 11. The spark plugs 9 are connected with respective ignition circuits 19 provided in an upper part of the cylinder head 5. In the example of FIG. 1, the ignition circuits 19 are provided corresponding to the number of the spark plugs 9; however, the number of the ignition circuits 19 may be more or less than the number of the spark plugs 9.

The ignition circuit 19 corresponding to each cylinder 13 energizes an ignition coil (non-illustrated) while receiving a control signal for carrying out an ignition electric discharge of the spark plug 9 from the PCM 21. Then, after a predetermined energization time has lapsed, if the control signal is no longer received, an ignition discharge current is given from a secondary winding of the ignition coil to cause the spark plug 9 to carry out the ignition electric discharge.

The ignition circuit 19 is provided with a capacitor 19a which is charged by the ignition electric discharge of the spark plug 9, and an ion current detecting circuit 19b for detecting the current flowing due to the capacitor 19a discharging the charged electrical charge as ion current. The ignition circuit 19 outputs a detection signal of the ion current detected by the ion current detecting circuit 19b to the PCM 21.

Two intake ports 15 and two exhaust ports 25 which communicate with each combustion chamber 11 are formed in the cylinder head 5. Intake and exhaust valves (two intake valves 35 and two exhaust valves 45) which open and close independently at predetermined timings by electromagnetic VVTs (Variable Valve Timing mechanisms) 35a and 45a are arranged in the port openings of the inlet ports 15 and the exhaust ports 25.

The open and close timings of the intake valves 35 and the exhaust valves 45 can be changed by the electromagnetic VVTs 35a and 45a toward the advancing side and the retarding side. Thereby, an overlapping period changes to vary an amount of combusted gas which remains inside the combustion chamber 11.

In each cylinder, an intake passage 55 is arranged so as to communicate with the inlet ports 15, and an exhaust passage 65 is arranged so as to communicate with the exhaust ports 25. The intake passage 55 and the exhaust passage 65 are connected with each other via an EGR passage 85 so that a part of the exhaust gas inside the exhaust passage 65 flows back to the intake passage 55 by an electric EGR valve 51 which is provided in the EGR passage 85 and can adjust its opening.

In the intake passage 55, from the upstream side, an air cleaner 75, an intake air temperature sensor 43, an airflow sensor 29 for detecting a flow rate of intake air, a throttle valve 41 for choking the intake passage 55 by being driven by an electric motor 41a, a TSCV (Tumble Swirl Control Valve) 31 for adjusting a strength of the intake air flow movement inside the combustion chamber 11, and an injector 39 for gasoline injection, which directly injects and supplies supplied gasoline into each combustion chamber 11, are arranged.

Figure 2:
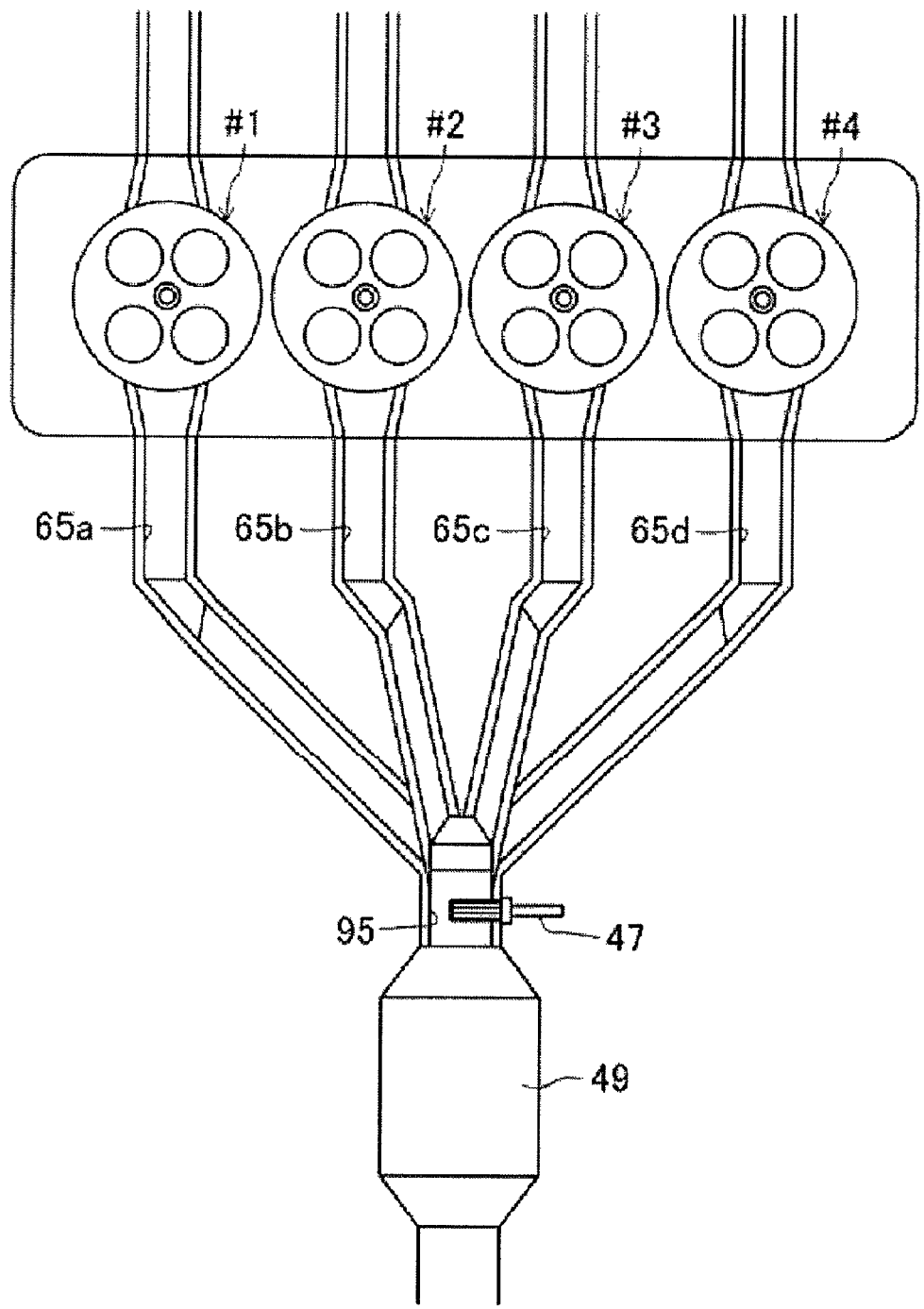
FIG. 2 is a view schematically showing a relation between each cylinder and an exhaust gas collecting part.

As shown in FIG. 2, in an exhaust gas collecting part 95 (exhaust manifold collecting part) of the exhaust passage 65, where the exhaust passages 65a, 65b, 65c and 65d from the four cylinders #1, #2, #3 and #4 gather, a linear $O_2$ sensor 47 (an example of an air fuel ratio detecting module) for detecting an air fuel ratio of air fuel mixture based on an oxygen concentration in exhaust gas, and a catalytic converter 49 for purifying the exhaust gas, are arranged. Note that, as the catalytic converter 49, a three-way catalyst which can simultaneously purify three components of HC, CO, and NOx may be used.

It is well known that the PCM 21 is provided with a CPU, a ROM, a RAM, an I/O interface circuit, etc. In the PCM 21, as signals required for the control according to this embodiment, at least, in addition to output signals of the crank angle sensor 37, the engine coolant temperature sensor 23, the airflow sensor 29, and the linear $O_2$ sensor 47, output signals of a throttle opening sensor 53 for detecting a throttle opening, and an engine speed sensor 57 for detecting an engine speed, are inputted. Then, the PCM 21 performs a feedback control of the engine 1 and a cylinder-to-cylinder gap abnormality detection control of an air fuel ratio based on the output signals of these sensors.

Figure 3:
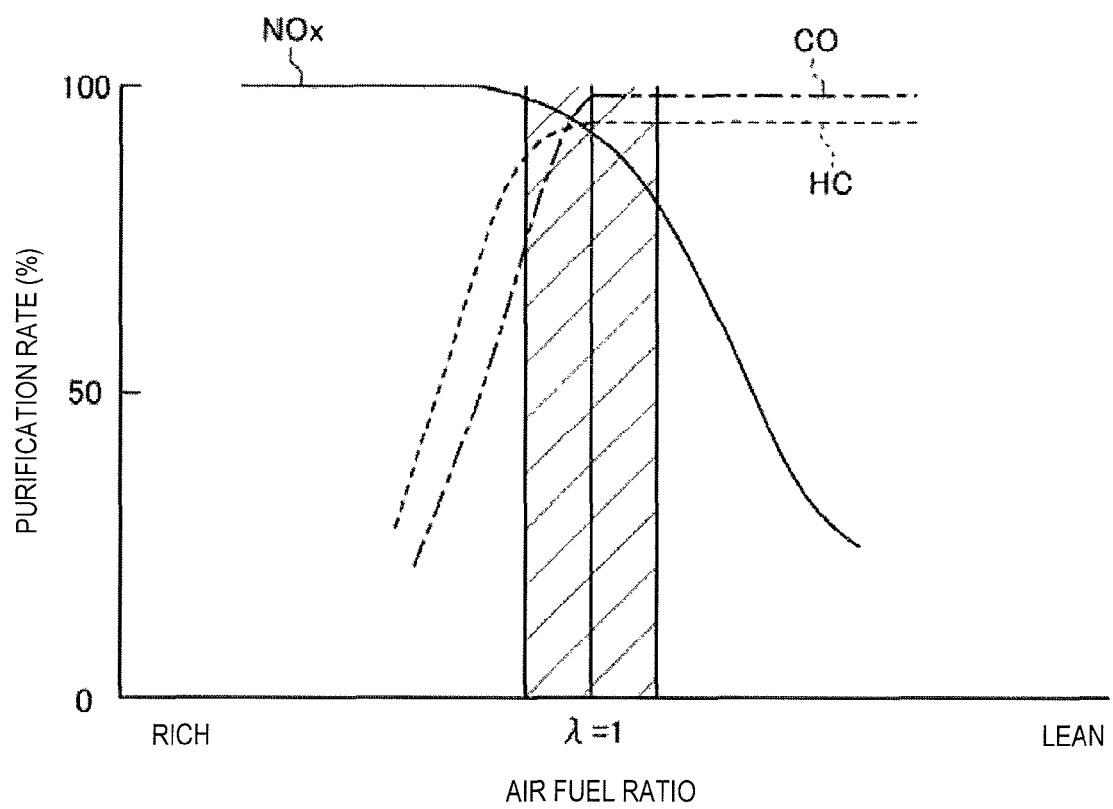
FIG. 3 is a graph schematically showing a purification rate of a three-way catalyst with respect to an air fuel ratio.

FIG. 3 is a graph schematically showing a purification rate (%) of the catalyst with respect to the air fuel ratio, where the air fuel ratio becomes richer as it goes to the left along the horizontal axis, and the purification rate by the catalyst increases as it goes upward along the vertical axis. As shown in FIG. 3, if the air fuel ratio becomes richer, HC, CO and the like are not purified sufficiently and tend to be discharged as they are, and if the air fuel ratio becomes leaner, the conversion capability of the catalyst is lost and $NO_2$ increases.

For this reason, the PCM 21 detects, so that an actual air fuel ratio of the engine 1 converges within a predetermined target air fuel ratio range which is centering on the theoretical air fuel ratio based on the detection value of the linear $O_2$ sensor 47, a rich state or a lean state of the oxygen concentration in the exhaust gas. The PCM 21 then precisely performs the feedback control of the fuel injection amount from the injector 39 which is set based on an intake air amount. Note that the target air fuel ratio range has an upper limit which is about 0.25 richer than the theoretical air fuel ratio state and a lower limit which is about 0.25 leaner than the theoretical air fuel ratio state.

By performing such a feedback control, a high purification rate can be attained for any of CO, HC, and NOx which are contained in the exhaust gas. However, if the cylinder-to-cylinder gap abnormality of the air fuel ratio of the supplied air fuel mixture arises, and, in other words, for example, if the other three cylinders are normal but only one cylinder is lean because of lack of the fuel injection amount, the following problems may arise.

That is, the gas discharged from each cylinder independently flows into the catalytic converter 49, respectively. Therefore, for example, if the gas discharged from the cylinder which is in the lean state into the catalytic converter 49, the conversion capability of the catalyst may be lost and $NO_2$ may be discharged to the outside. On the other hand, if the gas discharged from the cylinder which is in the rich state flows into the catalytic converter 49, HC, CO and the like are not purified and discharged as they are.

Therefore, the PCM 21 detects the cylinder-to-cylinder gap abnormality of the air fuel ratio of the supplied air fuel mixture based on the output value of the linear $O_2$ sensor 47. Specifically, while the engine is in operation, a difference value which is a rate of change of an excess air ratio $\lambda$ of the linear $O_2$ sensor 47 (=Output value/theoretical air fuel ratio) is calculated at an interval of a predetermined crank angle (for example, a crank angle synchronized with an ignition), and the absolute values of the difference values are integrated. Then, the PCM 21 determines whether the gap abnormality occurred based on whether the integrated value of the difference values of the excess air ratio $\lambda$ during a given time period exceeds a predetermined determination value.

In the meantime, an appropriate output characteristic of the linear $O_2$ sensor 47 needs to be secured as the premise for performing a high-precision abnormality determination. However, it is known in the art that there is a variation in the output characteristic depending on a mechanical individual specificity of the linear $O_2$ sensor 47 (i.e., depending on the product), or a variation in the output characteristic depending on a time-varying individual specificity (i.e., depending on a degree of degradation of the sensor). For this reason, depending on the variation of the output characteristic of the linear $O_2$ sensor 47, if the cylinder-to-cylinder gap of the air fuel ratio is very small (fallen within the target air fuel ratio range of FIG. 3), the PCM 21 may possibly determine it to be abnormal or, conversely, if the cylinder-to-cylinder gap of the air fuel ratio is large (fallen within the target air fuel ratio range of FIG. 3), the PCM 21 may possibly determine it not to be abnormal.

For this reason, whenever the engine 1 starts, the PCM 21 measures the output characteristic of the linear $O_2$ sensor 47, and compares the measured output characteristic with a reference characteristic set in advance. The PCM 21 then calculates an output correction value CV1 for correcting the output of the linear $O_2$ sensor 47 according to the individual specificity (including the mechanical individual specificity and/or the time-varying individual specificity) of the linear $O_2$ sensor 47.

Specifically, the PCM 21 includes an output characteristic measuring module 21a for measuring the output characteristic of the linear $O_2$ sensor 47, and a measurement condition determining module 21b. When the measurement condition determining module 21b determines that a first predetermined condition is satisfied, the output characteristic measuring module 21a repeatedly increases or decreases the fuel injection amount intentionally for a predetermined number of times, and measures values related to a dead time and a response of the linear $O_2$ sensor 47 at that time. The term "dead time" as used herein refers to a time required from the correction of the air fuel ratio of the air fuel mixture to the detection of the change in the air fuel ratio of the exhaust gas by the linear $O_2$ sensor 47. The term "response" as used herein refers to a rate of change in the air fuel ratio which is detected after the linear $O_2$ sensor 47 detects the change in the air fuel ratio of the exhaust gas.

Here, the first predetermined condition is a condition to exclude a case where the influence on an engine speed Ne is large (the influence on a vehicle's traveling performance is large) if the air fuel ratio is fluctuated (increasing or decreasing the fuel injection amount). Therefore, the measurement condition determining module 21b determines that the first predetermined condition is satisfied, for example, in a state where an engine warm-up operation is finished (that is, a state where a coolant temperature Tw is above a given temperature), and in a state where each variation of the engine speed Ne, an air intake filling efficiency and a throttle opening Th is small (below a predetermined value), and these values are stable. On the other hand, the measurement condition determining module 21b does not determine that the first predetermined condition is satisfied, for example, if the engine speed is in a low speed range like in idling.

When measuring the output characteristic of the linear $O_2$ sensor 47 for two or more times (for example, when performing a varying control for decreasing the fuel injection amount after increasing the amount, for five times (the predetermined number of times)), it is not necessary to perform the varying control consecutively for five times. If each varying control (from the start of increasing the amount to the end of decreasing the amount) is performed under the first predetermined condition, the measurement may be performed intermittently.

The PCM 21 further includes a correction value calculating module 21c for comparing the dead time and the response which are measured, with the reference characteristic (reference dead time and reference response) set in advance, and calculating an output correction value CV1 for correcting an output value OV1 of the linear $O_2$ sensor 47 according to the mechanical individual specificity and/or the time-varying individual specificity of the linear $O_2$ sensor 47. Here, the reference characteristic is set based on the median of the variation in the output characteristic of the linear $O_2$ sensor 47 caused by the mechanical individual specificity of the linear $O_2$ sensor 47 (median of the product variation). Herein, a linear $O_2$ sensor which does not have a time-varying individual specificity (i.e., a brand-new linear $O_2$ sensor) is used as a sample product, for example. The dead time and the response when the increase or decrease of the fuel injection amount is performed for every sample are measured, and, these medians are set as the reference dead time and the reference response, respectively.

Figure 4:
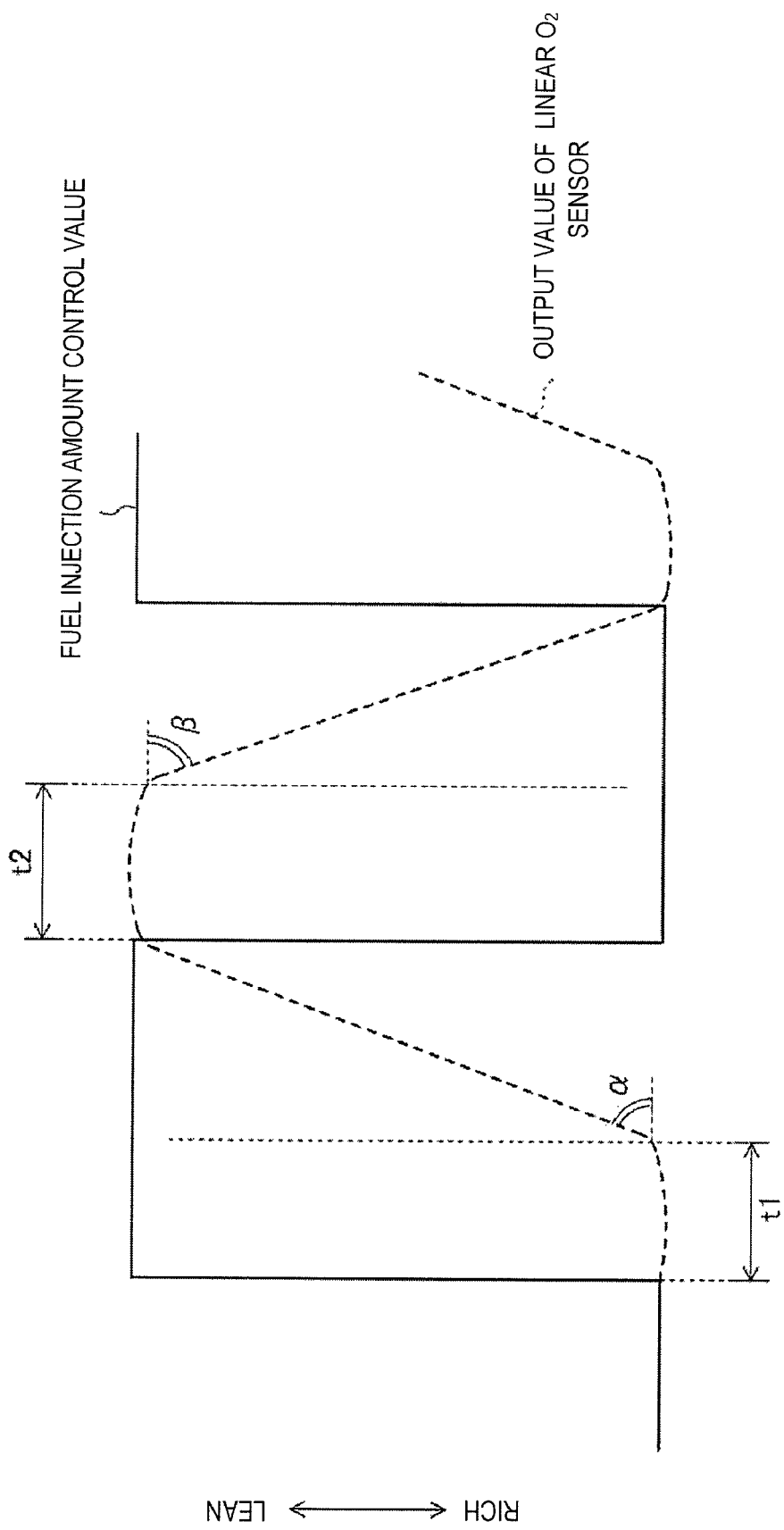
FIG. 4 is a graph schematically showing a relation between a fuel injection amount control value and a linear $O_2$ sensor output value.

FIG. 4 is a graph schematically showing a relation between a fuel injection amount control value and the output value of the linear $O_2$ sensor. In this figure, "t1" indicates a dead time from rich to lean, "t2" indicates a dead time from lean to rich, "a" indicates a response from rich to lean, and β indicates a response from lean to rich. As shown in FIG. 4, the linear $O_2$ sensor 47 takes the time t1 to detect a change from rich to lean of the the air fuel ratio by decreasing the fuel injection amount, and then, it detects α as the rate of change in the air fuel ratio from rich to lean. Similarly, the linear $O_2$ sensor 47 takes the time t2 to detect a change from lean to rich of the air fuel ratio by increasing the fuel injection amount, and then, it detects β as the rate of change in the air fuel ratio from lean to rich.

FIGS. 5A and 5B are graphs schematically showing relations between the output characteristic and the reference characteristic of the linear $O_2$ sensor which are measured. FIG. 5A shows a case where the measured response is smaller than the reference response, and FIG. 5B shows a case where the measured dead time is longer than the reference dead time. As shown in FIGS. 5A and 5B, it can be seen that the output value becomes small when the response of the linear $O_2$ sensor 47 is smaller than the reference response (the inclination is small), and the output value becomes small when a one-way dead time (dead time from rich to lean) of the linear $O_2$ sensor 47 is longer than the reference dead time.

Figure 6:
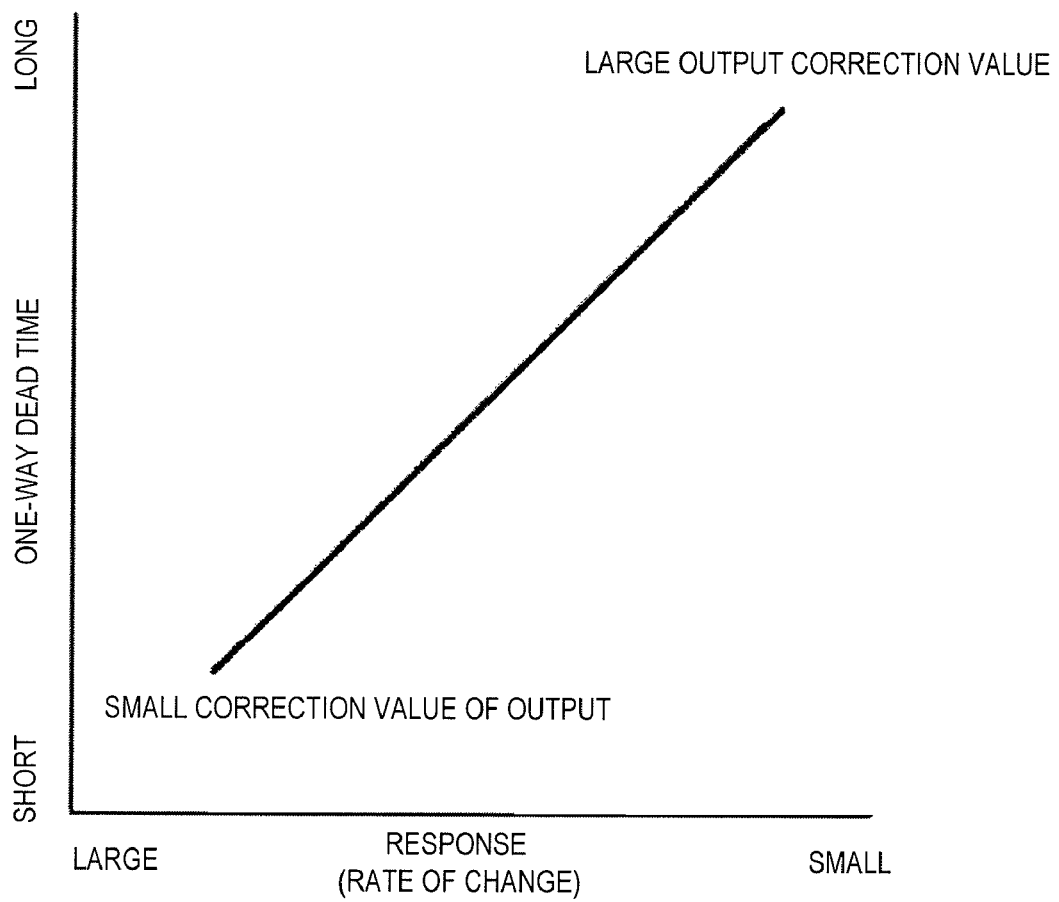
FIG. 6 is a graph schematically showing a relation of an output correction value with respect to the response of the linear $O_2$ sensor and the one-way dead time.

For this reason, the output correction value CV1 calculated by the correction value calculating module 21c takes a value so that the output value of the linear $O_2$ sensor 47 is increased when the measured output characteristic is smaller as compared with the reference characteristic, and takes a value so that the output value of the linear $O_2$ sensor 47 is decreased when the measured output characteristic is larger as compared with the reference characteristic. In other words, as shown in FIG. 6, if the measured response (rate of change) is smaller than the reference response and the measured dead time is longer than the reference dead time, the correction value calculating module 21c calculates the output correction value CV1 so that the output value of the linear $O_2$ sensor 47 is increased. On the other hand, if the measured response (rate of change) is larger than the reference response and the measured dead time is shorter than the reference dead time, the correction value calculating module 21c calculates the output correction value CV1 so that the output value of the linear $O_2$ sensor 47 is decreased. More specifically, in this embodiment, the output correction value CV1 (a diagnosis correction value CV2, described later in detail) is multiplied to correct the output value of the linear $O_2$ sensor 47. Therefore, if the measured output characteristic is smaller as compared with the reference characteristic, the correction value calculating module 21c calculates a value equal to or greater than 1 as the output correction value CV1. On the other hand, if the measured output characteristic is larger as compared with the reference characteristic, the correction value calculating module 21c calculates a value less than 1 as the output correction value CV1. Thus, the output correction value CV1 calculated by the correction value calculating module 21c is inputted into an output value correcting module 21d provided in the PCM 21.

The output value correcting module 21d corrects the output value OV1 of the linear $O_2$ sensor 47 under the second predetermined condition. Specifically, if the measurement condition determining module 21b determines that the second predetermined condition is satisfied, the output value correcting module 21d measures the output value OV1 of the linear $O_2$ sensor 47, and corrects the measured output value OV1 based on the output correction value CV1 calculated by the correction value calculating module 21c.

Note that the second predetermined condition checks whether the output correction value CV1 is calculated by the correction value calculating module 21c, and excludes the state where the output value of the linear $O_2$ sensor 47 is hard to secure. Therefore, after the output correction value CV1 is calculated by the correction value calculating module 21c, for example, in a state which often occurs when the vehicle travels (for example, a middle-speed and high-load state), the measurement condition determining module 21b determines that the second predetermined condition is satisfied. On the other hand, if the output correction value CV1 is not calculated by the correction value calculating module 21c or, for example, in a low speed range like at the time of idling, the measurement condition determining module 21b does not determine that the second predetermined condition is satisfied.

The output value correcting module 21d corrects the output value OV1 of the linear $O_2$ sensor 47 using the output correction value CV1 calculated by the correction value calculating module 21c as described above. However, if the load and the engine speed when calculating the output correction value CV1 deviate excessively from the load and the engine speed when detecting the output value OV1 of the linear $O_2$ sensor 47, which are to be corrected based on the output correction value CV1, it may be difficult to detect the cylinder-to-cylinder gap abnormality in the air fuel ratio with sufficient accuracy.

In more detail, a space from the cylinder to the linear $O_2$ sensor 47 provided to the exhaust gas collecting part 95 has a constant volume. Therefore, a time it takes the exhaust gas to reach the linear $O_2$ sensor 47 after being discharged from each cylinder depends on the speed of the exhaust gas filling the space or, for example, depending on the exhaust gas flow rate. In other words, a time it takes the exhaust gas to be detectable by the linear $O_2$ sensor 47 after being discharged from the cylinder is shorter as the exhaust gas flow rate becomes lower. Therefore, if the exhaust gas flow rate is high, the output characteristic of the linear $O_2$ sensor 47 is measured as if it is improved as compared with the case where the exhaust gas flow rate is low.

Figure 7:
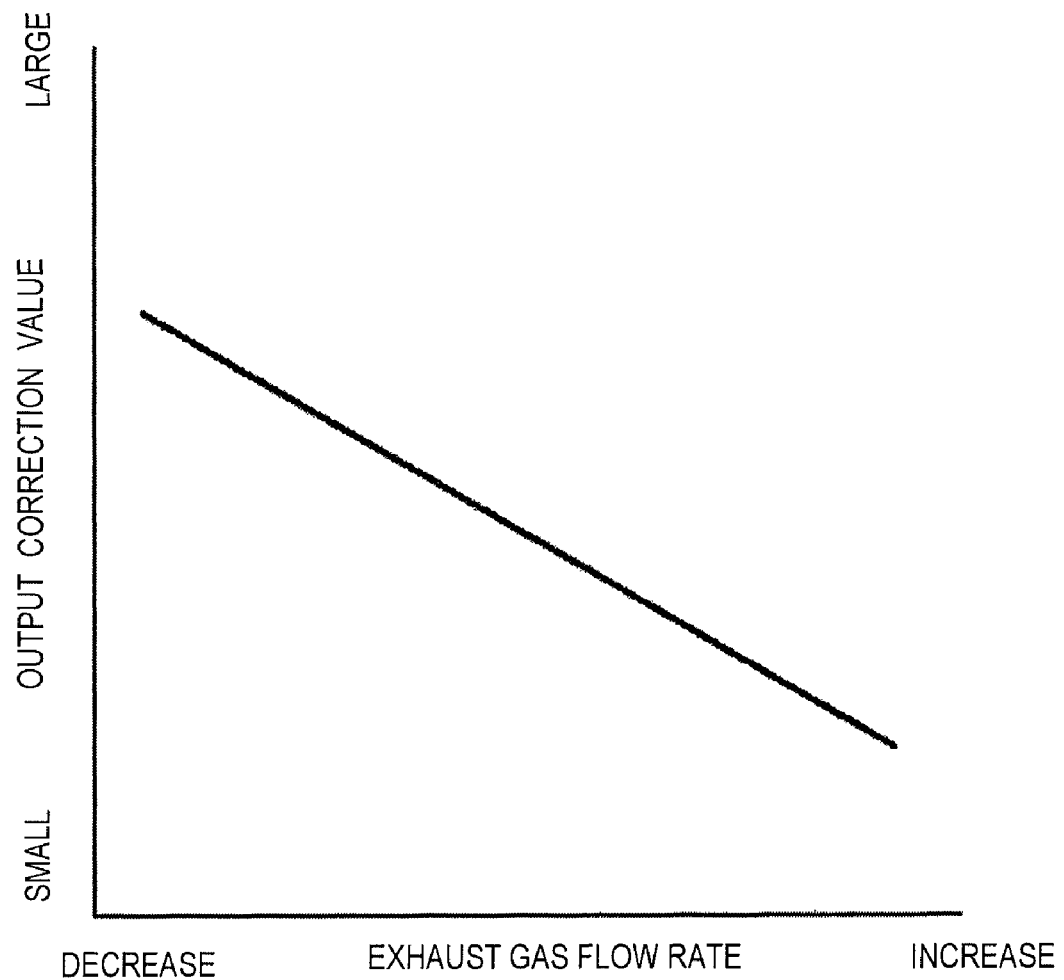
FIG. 7 is a graph schematically showing a relation between the output correction value and an exhaust gas flow rate.

For this reason, as shown in FIG. 7, the output value correcting module 21*d* corrects the output correction value CV1 so that the output correction value CV1 is larger as the exhaust gas flow rate when correcting the output value OV1 of the linear $O_2$ sensor 47 (a value related to the exhaust gas flow rate) decreases rather than the exhaust gas flow rate when measuring the output characteristic of the linear $O_2$ sensor 47 (a value related to the exhaust gas flow rate). On the other hand, the output value correcting module 21*d* corrects the output correction value CV1 so that the output correction value CV1 is smaller as it increases rather than the exhaust gas flow rate when measuring the output characteristic of the linear $O_2$ sensor 47 (a value related to the exhaust gas flow rate).

Note that, if $\lambda=1$, since the exhaust gas flow rate can be determined by the sum of the fuel amount and the intake air flow rate, the intake air flow rate detected by the airflow sensor 29 can be used as the value related to the exhaust gas flow rate.

When the engine speed is increased, the time required for the linear $O_2$ sensor 47 to detect the change of the air fuel ratio is not necessarily shortened, but the interval of change becomes short. Therefore, while detecting the air fuel ratio of the exhaust gas discharged from a certain cylinder, it will be influenced by air fuel ratios of exhaust gas discharged from other cylinders. For this reason, when the engine speed is high, the output characteristic of the linear $O_2$ sensor 47 is measured as if it is decreased as compared with the case where the engine speed is low.

Figure 8:
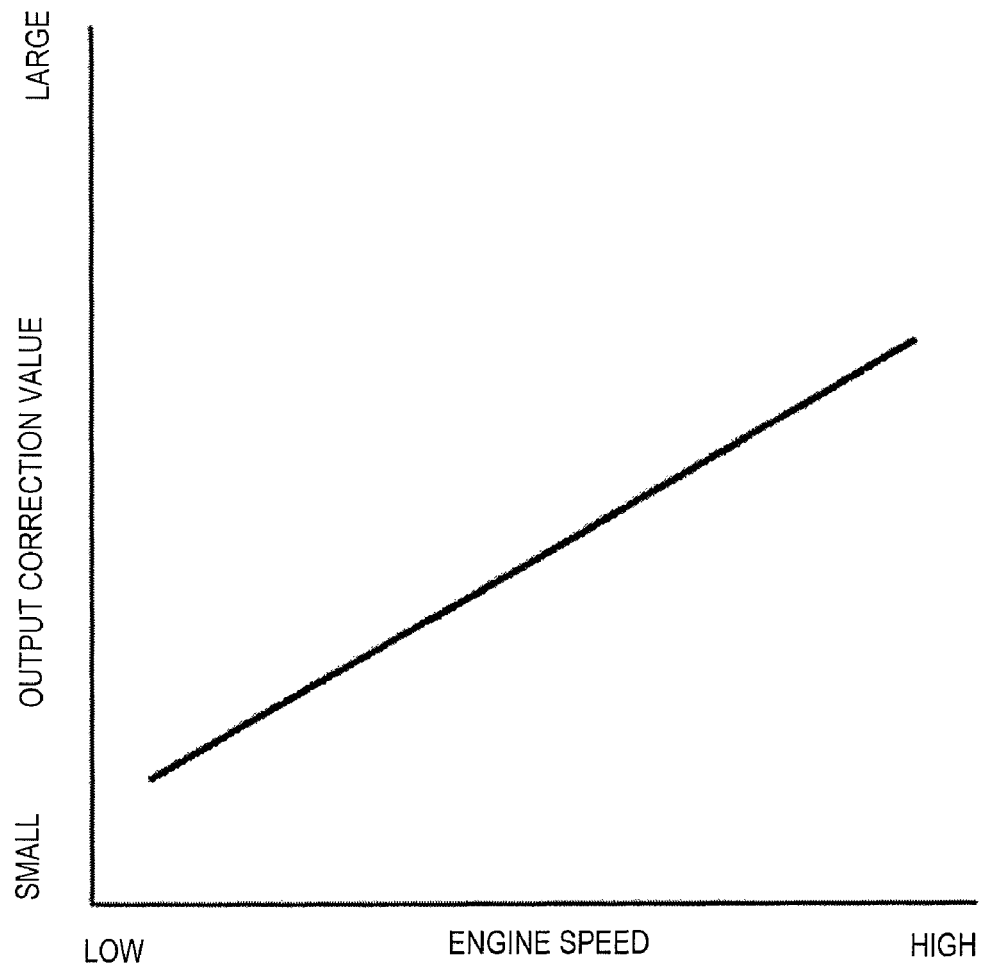
FIG. 8 is a graph schematically showing a relation between the output correction value and an engine speed.

Therefore, as shown in FIG. 8, the output value correcting module 21*d* corrects the output correction value CV1 so that the output correction value CV1 is smaller as the engine speed when correcting the output value OV1 of the linear $O_2$ sensor 47 decreases rather than the engine speed when measuring the output characteristic of the linear $O_2$ sensor 47. On the other hand, the output value correcting module 21*d* corrects the output correction value CV1 so that the output correction value CV1 is larger as the engine speed when correcting the output value OV1 of the linear $O_2$ sensor 47 increases rather than the engine speed when measuring the output characteristic of the linear $O_2$ sensor 47.

Then, the output value correcting module 21*d* corrects the output value OV1 of the linear $O_2$ sensor 47 by using the diagnosis correction value CV2 corrected according to the difference between the exhaust gas flow rate (or engine speed) when correcting the output value OV1 of the linear $O_2$ sensor 47 and the exhaust gas flow rate (or engine speed) when measuring the output characteristic of the linear $O_2$ sensor 47. Thus, the diagnosis output value OV2 corrected by the output value correcting module 21*d* is inputted into a gap abnormality detecting module 21*e* provided in the PCM 21.

The gap abnormality detecting module 21*e* calculates the excess air ratio $\lambda$(=Output value/theoretical air fuel ratio) using the diagnosis output value OV2 of the linear $O_2$ sensor 47 corrected by the output value correcting module 21*d*. The gap abnormality detecting module 21*e* then calculates the difference value which is a rate of change of the excess air ratio $\lambda$, as described above, and integrates absolute values of the difference values. Then, the gap abnormality detecting module 21*e* determines whether the gap abnormality occurred by determining whether the integrated value of the difference values of the excess air ratios $\lambda$ during a given time period is above the predetermined determination value.

Here, if the air fuel ratios of the supplied air fuel mixture to the cylinders #1 to #4 are normal, the excess air ratio $\lambda$ will be settled near the theoretical air fuel ratio. However, if the air fuel ratio of any of the cylinders becomes abnormal, the air fuel ratios of the exhaust gas will cause a gap between the cylinders and the variation of the excess air ratios $\lambda$ becomes large, thereby the integrated value of the difference values of the excess air ratios $\lambda$ will be large. For this reason, it is possible to determine whether the air fuel ratio of any of the cylinders is abnormal by determining whether the integrated value of the difference values of the excess air ratios $\lambda$ during the given time period is above the predetermined value.

—Processing Operation of Abnormality Detecting Device—

<<Correction Value Calculation Processing>>

Figure 9:
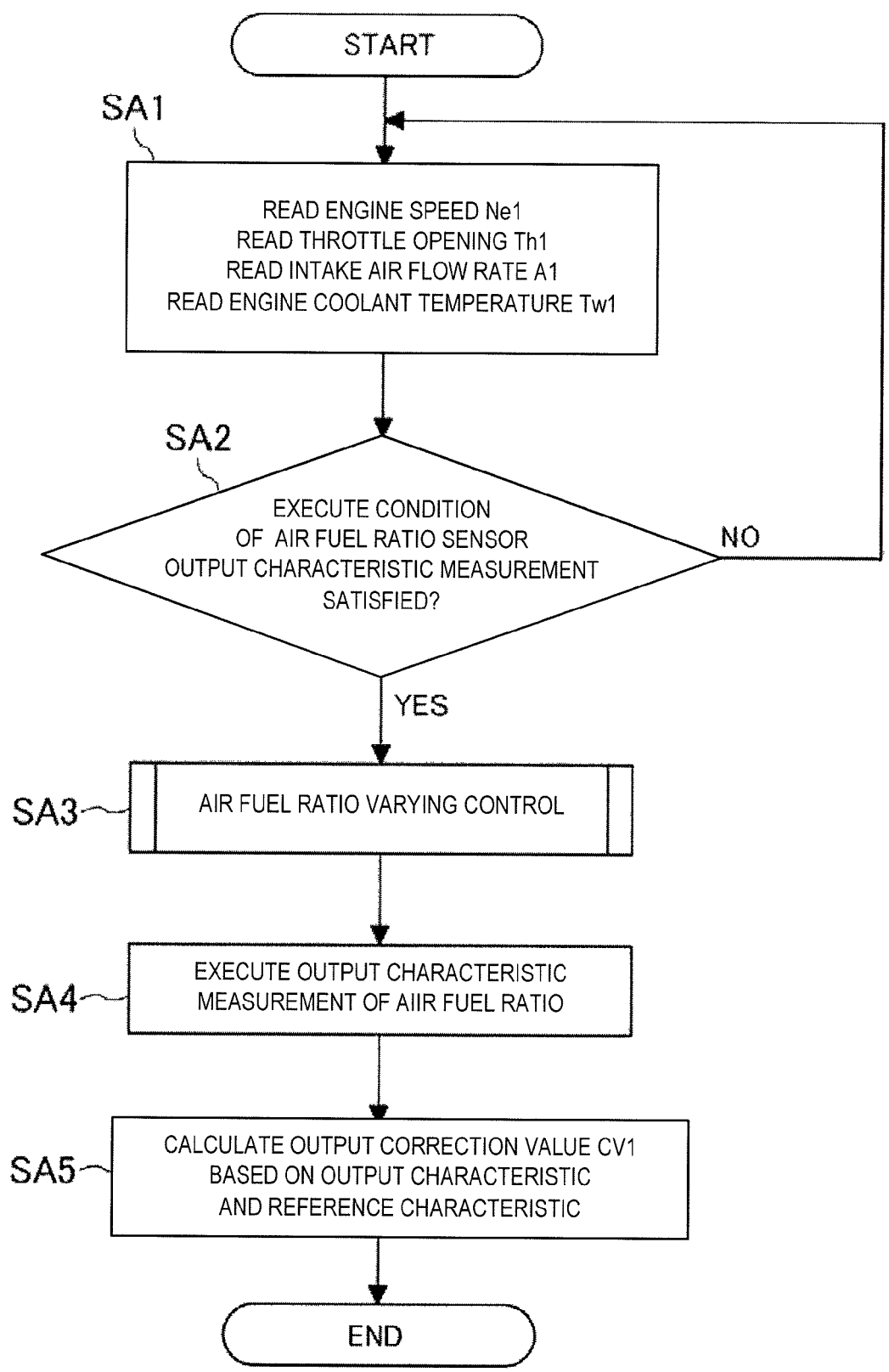
FIG. 9 is a flowchart showing a control of a PCM.

Here, correction value calculation processing of the abnormality detecting device is described with reference to a flowchart shown in FIG. 9.

The routine shown in this flowchart is started by turning on the ignition. First, at step SA1, the measurement condition determining module 21*b* reads the engine speed Ne1 detected by the engine speed sensor 57, the throttle opening Th1 detected by the throttle opening sensor 53, the intake air flow rate A1 detected by the airflow sensor 29, and the engine coolant temperature Tw1 detected by the engine coolant temperature sensor 23, and the routine then proceeds to step SA2.

At step SA2, the measurement condition determining module 21*b* determines whether an execute condition of the air fuel ratio sensor output characteristic measurement (i.e., the output characteristic measurement of the linear $O_2$ sensor 47) is satisfied. In more detail, it determines whether the engine coolant temperature Tw1 is higher than the given temperature indicating the completion of engine warm-up, or whether each variation of the engine speed Ne1, the air intake filling efficiency, and the throttle opening Th1 are small and stable. If the determination at step SA2 is NO (for example, in a low speed range like in idling, the routine returns to step SA1.

On the other hand, if the determination at step SA2 is YES (i.e., if it is determined that the influence on the traveling performance is small even when the air fuel ratio is varied), the routine proceeds to step SA3, and, after performing an air fuel ratio varying control described later, the routine proceeds to step SA4. At step SA4, the output characteristic measuring module 21*a* executes the output characteristic measurement of the air fuel ratio sensor (i.e., measures the dead time and the response of the linear $O_2$ sensor 47 corresponding to the increase and decrease of the fuel amount in the air fuel ratio varying control). Then, the routine proceeds to step SA5.

In step SA5, the correction value calculating module 21*c* calculates, based on the dead time and the response of the linear $O_2$ sensor 47 measured at step SA4, and the reference characteristic (the reference dead time and the reference response) stored in advance, which is set based on the median of the variation in the output characteristic caused by the mechanical individual specificity of the linear $O_2$ sensor 47, the output correction value CV1 for correcting the output value of the linear $O_2$ sensor 47 according to the individual specificity of the linear $O_2$ sensor 47. Specifically, if the measured response (rate of change) is smaller than the reference response and the measured dead time is longer than the reference dead time, the correction value calculating module 21*c* calculates the output correction value CV1 so that the output value of the linear $O_2$ sensor 47 is increased. On the other hand, if the measured response (rate of change) is larger than the reference response and the measured dead time is shorter than the reference dead time, the correction value calculating module 21c calculates the output correction value CV1 so that the output value of the linear $O_2$ sensor 47 is decreased. Then, the routine ends.

<<Air Fuel Ratio Varying Control>>

Figure 10:
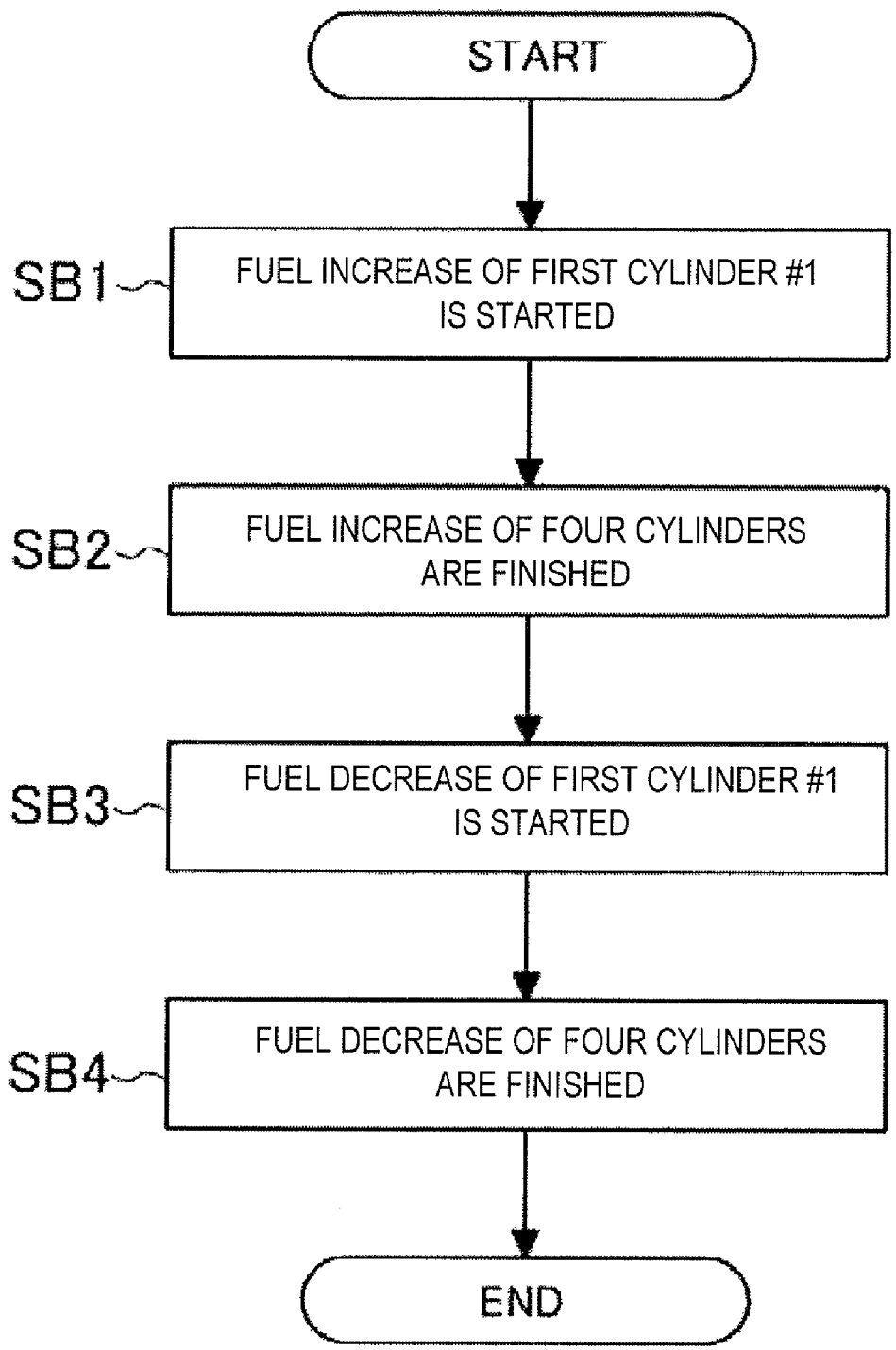
FIG. 10 is a flowchart illustrating a procedure of the control of an air fuel ratio varying control subroutine.

Next, a subroutine of the air fuel ratio varying control (step SA3) is described with reference to a flowchart shown in FIG. 10.

First, at step SB1, first, a fuel increase is started from the first cylinder #1 among the four cylinders, and the routine then proceeds to step SB2. At step SB2, the fuel amount is increased in order of the third cylinder #3, the fourth cylinder #4, and the second cylinder #2. After the fuel increases of the four cylinders are finished, the routine proceeds to step SB3.

At step SB3, a fuel decrease is started from the first cylinder #1 among the four cylinders, and the routine then proceeds to step SB4. At step SB4, the fuel amount is decreased in order of the third cylinder #3, the fourth cylinder #4, and the second cylinder #2. After the fuel decreases of the four cylinders are finished, the routine ends. As described above, since the increase or the decrease of the fuel injection amount is started always from a specific cylinder (e.g., the first cylinder #1) when varying the fuel injection amount, a measurement error resulting from varying the cylinder at which the varying of the fuel injection amount is started is suppressed. Although the air fuel ratio varying control for increasing and decreasing the fuel injection amount is performed only one time in this embodiment, the fuel varying control may be performed for two or more times.

<<Output Value Correction Processing>>

Figure 11:
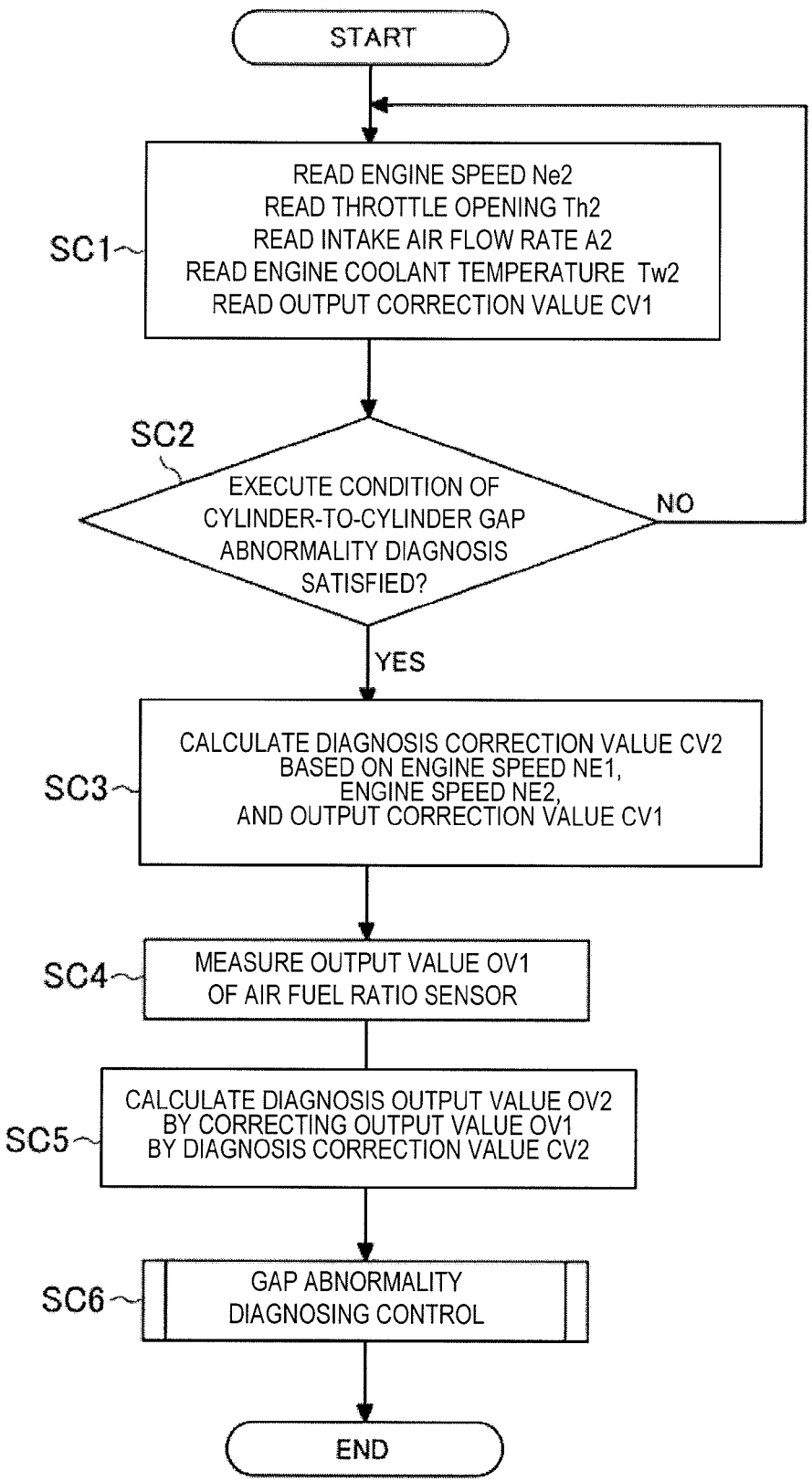
FIG. 11 is a flowchart showing a control of the PCM.

Next, output value correction processing is described with reference to a flowchart shown in FIG. 11.

First, at step SC1, the measurement condition determining module 21b reads the engine speed Ne2 detected by the engine speed sensor 57, the throttle opening Th2 detected by the throttle opening sensor 53, the intake air flow rate A2 detected by the airflow sensor 29, the engine coolant temperature Tw2 detected by the engine coolant temperature sensor 23, and the output correction value CV1 calculated by the correction value calculating module 21c. Then, the routine proceeds to step SC2.

At step SC2, the measurement condition determining module 21b determines whether an execute condition of the cylinder-to-cylinder gap abnormality diagnosis is satisfied. If the determination at step SC2 is NO (i.e., if the output correction value CV1 calculated by the correction value calculating module 21c is not read, or if the engine speed Ne2 is in a low speed range like, for example, in idling, the routine returns to step SC1.

On the other hand, if the determination at step SC2 is YES, the routine proceeds to step SC3 where the output value correcting module 21d calculates the diagnosis correction value CV2 based on the engine speed Ne1, the engine speed Ne2, and the output correction value CV1. Specifically, the output value correcting module 21d corrects the output correction value CV1 so that the output correction value CV1 is smaller as the engine speed Ne2 when correcting the output value OV1 of the linear $O_2$ sensor 47 decreases rather than the engine speed Ne1 when measuring the output characteristic of the linear $O_2$ sensor 47. On the other hand, the output value correcting module 21d corrects the output correction value CV1 so that the output correction value CV1 is larger as the engine speed Ne2 when correcting the output value OV1 of the linear $O_2$ sensor 47 increases rather than the engine speed Ne1 when measuring the output characteristic of the linear $O_2$ sensor 47. The output value correcting module 21d then calculates the diagnosis correction value CV2. Then, the routine proceeds to step SC4.

At step SC4, the output value correcting module 21d measures the output value OV1 of the linear $O_2$ sensor 47, and then, the routine proceeds to step SC5. At step SC5, the output value correcting module 21d corrects the output value OV1 of the linear $O_2$ sensor 47 measured at step SC4, by using the diagnosis correction value CV2 calculated at step SC3. Specifically, the diagnosis output value OV2 is calculated by multiplying the output value OV1 by the diagnosis correction value CV2. Then, the routine proceeds to step SC6.

At step SC6, after performing a gap abnormality diagnosing control described later, the routine ends.

<<Gap Abnormality Diagnosing Control>>

Figure 12:
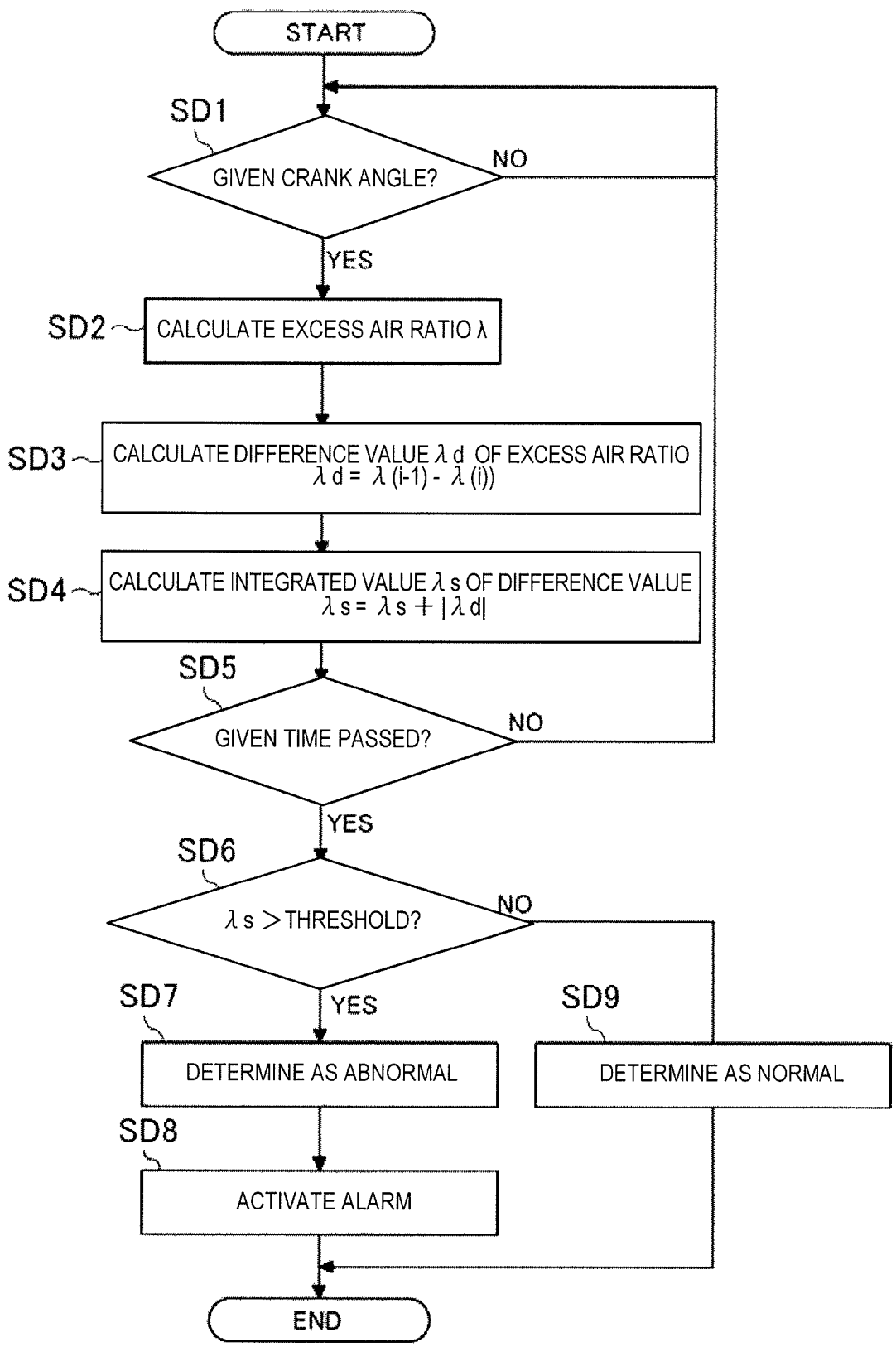
FIG. 12 is a flowchart illustrating a procedure of the control of a gap abnormality diagnosing control subroutine.

Next, a subroutine of the gap abnormality diagnosing control (step SC6) is described with reference to a flowchart shown in FIG. 12.

First, at step SD1, it is determined whether a current crank angle is a predetermined crank angle, from which a difference value λd of the excess air ratio λ is calculated, based on the signal from the crank angle sensor 37. If the determination at step SD1 is NO, the routine returns to step SD1. On the other hand, if the determination at step SD1 is YES, the routine proceeds to step SD2.

At step SD2, the excess air ratio λ (=diagnosis output value OV2/theoretical air fuel ratio) is calculated. Then, the routine proceeds to step SD3.

At step SD3, a previous excess air ratio λ (one time before) is set to λ(i−1), and a current excess air ratio λ is set to λ(i). Then, a difference value λd (=λ(i−1)−λ(i)) of the excess air ratio λ is calculated. Then, the routine proceeds to step SD4.

At step SD4, an absolute value |λd| of the difference value λd of the current excess air ratio λ calculated at step SD3 is added to an integrated value λs of the difference value of the previous excess air ratio λ stored in the PCM 21 to obtain the integrated value λs of the difference value of the current excess air ratio λ. Then, the routine proceeds to step SD5.

At step SD5, it is determined whether a time period, during which the absolute values |λd| of the difference values λd of the excess air ratio λ are integrated, has passed a given time period. If the determination at step SD5 is NO, the routine returns to step SD1 where the addition of the difference value to the integrated value λs is continued. On the other hand, if the determination at step SD5 is YES, the routine proceeds to step SD6.

At step SD6, it is determined whether the integrated value λs of the difference values of the excess air ratio λ is larger than a predetermined threshold. If the determination at step SD6 is NO, the routine proceeds to step SD9. After it is determined that it is normal, the routine ends. On the other hand, if the determination at step SD6 is YES, the routine proceeds to step SD7 where it is determined that the cylinder-to-cylinder gap abnormality of the air fuel ratio of the supplied air fuel mixture occurred. Then, the routine proceeds to step SD8.

At step SD8, by activating an alarm (blinking a warning lamp 59), an operator of the vehicle is informed of the occurrence of the cylinder-to-cylinder gap abnormality of the air fuel ratio of the supplied air fuel mixture. Then, the routine ends.

—Effects—

In this embodiment, even when an appropriate output value is not outputted due to the mechanical individual specificity (variation in the output characteristic for every product) and/or the time-varying individual specificity (degree of degradation) of the linear $O_2$ sensor 47, the output value OV1 of the linear $O_2$ sensor 47 detected under the second predetermined condition is corrected based on the output correction value CV1 calculated under the first predetermined condition. Thereby, the cylinder-to-cylinder gap abnormality of the air fuel ratio can be detected with sufficient accuracy.

Further, the output correction value CV1 takes the value so that the output value OV1 of the linear $O_2$ sensor 47 is increased when the measured output characteristic is small as compared with the reference characteristic. Therefore, when the cylinder-to-cylinder gap of the air fuel ratio is large in fact, an erroneous determination that it is not abnormal can be suppressed. On the other hand, the output correction value CV1 takes the value so that the output value OV1 of the linear $O_2$ sensor 47 is decreased when the measured output characteristic is large as compared with the reference characteristic. Therefore, when the cylinder-to-cylinder gap of the air fuel ratio is very small in fact, the erroneous determination that it is abnormal can be suppressed. As described above, the cylinder-to-cylinder gap abnormality of the air fuel ratio can be detected with sufficient accuracy.

The output correction value CV1 is made smaller as the engine speed Ne2 when correcting the output value OV1 of the linear $O_2$ sensor 47 decreases rather than the engine speed Ne1 when measuring the output characteristic of the linear $O_2$ sensor 47. On the other hand, the output correction value CV1 is made smaller as the engine speed Ne2 when correcting the output value OV1 of the linear $O_2$ sensor 47 increases rather than the engine speed Ne1 when measuring the output characteristic of the linear $O_2$ sensor 47. Therefore, even if a correction value calculated with a different engine speed is used, the cylinder-to-cylinder gap abnormality of the air fuel ratio can be detected with sufficient accuracy.

Moreover, the reference characteristic is set based on the median of the variation in the output characteristic of the linear $O_2$ sensor 47 caused by the mechanical individual specificity of the linear $O_2$ sensor 47. Thus, the linear $O_2$ sensor 47 which has an extremely long dead time and a low response is excluded from the linear $O_2$ sensors 47 to calculate the reference characteristic of the linear $O_2$ sensor 47. Therefore, the reliability to the reference characteristic is improved.

(Other Embodiments)

The present invention is not limited to the above embodiment, but it may be implemented in other various forms without deviating from the spirit or the subject matters.

In the above embodiment, the correction value is corrected based on the engine speed when correcting the output value of the linear $O_2$ sensor 47. However, without limiting to this, for example, the correction value may be corrected based on the exhaust gas flow rate when correcting the output of the linear $O_2$ sensor 47.

In the above embodiment, it is determined whether the air fuel ratio of any of the cylinders is abnormal by determining whether the integrated value of the difference values of the excess air ratio λ during the given time period is above the predetermined value. However, without limiting to this, other determination techniques may also be used.

In the above embodiment, the reference characteristic (the reference dead time and the reference response) is set to the median of the product variation of the linear $O_2$ sensor 47. However, without limiting to this, it may be set to a design criteria value of the linear $O_2$ sensor 47, for example.

In the above embodiment, the output value OV1 of the linear $O_2$ sensor 47 is corrected by multiplying by the diagnosis correction value CV2. However, without limiting to this, the output value OV1 may be corrected by adding or subtracting the diagnosis correction value CV2 to/from the output value OV1, for example.

As described above, the above embodiment is merely an illustration in all aspects and, therefore, it must not be interpreted in a limited way. In addition, all of modifications and changes falling under the equivalent range of the claims are within the scope of the present invention.

As described above, the present invention is useful for the method, device and the like for detecting the abnormality of the engine, which detects the cylinder-to-cylinder gap abnormality of the air fuel ratio of the supplied air fuel mixture based on the output of the air fuel ratio detecting module.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of detecting an abnormality for an engine, comprising:
    providing an air fuel ratio detecting module in an engine exhaust system, the air fuel ratio detecting module outputting a value proportional to an oxygen concentration in exhaust gas;
    measuring an output characteristic of the air fuel ratio detecting module under a first predetermined condition;
    comparing the measured output characteristic with a reference characteristic set in advance and calculating a correction value for correcting the output value of the air fuel ratio detecting module according to an individual specificity of the air fuel ratio detecting module;
    detecting the output value of the air fuel ratio detecting module under a second predetermined condition and correcting the detected output value based on the correction value; and
    detecting a cylinder-to-cylinder gap abnormality of an air fuel ratio of supplied air fuel mixture based on the corrected output value of the air fuel ratio detecting module.

2. The method of claim 1, wherein the correction value takes a value so that the output value of the air fuel ratio detecting module is increased when the measured output characteristic is small as compared with the reference characteristic, and takes a value so that the output value of the air fuel ratio detecting module is decreased when the measured output characteristic is large as compared with the reference characteristic.

3. The method of claim 1, wherein the output value correcting step includes correcting the correction value based on a value related to an exhaust gas flow rate and/or an engine speed when correcting the output value of the air fuel ratio detecting module, the output value of the air fuel ratio detecting module being corrected based on the corrected correction value.

4. The method of claim 3, wherein the correction value is corrected to be larger as the value related to the exhaust gas flow rate when correcting the output value of the air fuel ratio detecting module decreases rather than the value related to the exhaust gas flow rate when measuring the output characteristic of the air fuel ratio detecting module, and is corrected to be smaller as the value related to the exhaust gas flow rate when correcting the output value of the air fuel ratio detecting module increases rather than the value related to the exhaust gas flow rate when measuring the output characteristic of the air fuel ratio detecting module.

5. The method of claim 3, wherein the correction value is corrected to be smaller as the engine speed decreases when the engine speed at the time of correcting the output value of the air fuel ratio detecting module decreases to less than the engine speed at the time of measuring the output characteristic of the air fuel ratio detecting module, and is corrected to be larger as the engine speed increases when correcting the output value of the air fuel ratio detecting module increases to more than the engine speed when measuring the output characteristic of the air fuel ratio detecting module.

6. The method of claim 1, wherein the output characteristic is related to a dead time and a response.

7. The method of claim 1, wherein the reference characteristic is set based on a median of a variation in the output characteristic of the air fuel ratio detecting module, which is caused by a mechanical individual specificity of the air fuel ratio detecting module.

8. An abnormality detecting device for an engine, comprising:

an air fuel ratio detecting module provided in an engine exhaust system and for outputting a value proportional to an oxygen concentration in exhaust gas;

a measuring module for measuring an output characteristic of the air fuel ratio detecting module under a first predetermined condition;

a correction value calculating module for comparing the measured output characteristic with a reference characteristic set in advance and calculating a correction value for correcting the output value of the air fuel ratio detecting module according to an individual specificity of the air fuel ratio detecting module; and an output value correcting module for correcting the output value of the air fuel ratio detecting module under a second predetermined condition based on the correction value calculated by the correction value calculating module;

wherein a cylinder-to-cylinder gap abnormality of an air fuel ratio of supplied air fuel mixture is detected based on an output value of the air fuel ratio detecting module corrected by the output value correction module.

* * * * *